(12) United States Patent
Waters

(10) Patent No.: US 10,856,534 B2
(45) Date of Patent: Dec. 8, 2020

(54) FISHING TOOL

(71) Applicant: Jeffery Waters, Philadelphia, PA (US)

(72) Inventor: Jeffery Waters, Philadelphia, PA (US)

(*) Notice: Subject to any disclaimer, the term of this patent is extended or adjusted under 35 U.S.C. 154(b) by 140 days.

(21) Appl. No.: 15/648,155

(22) Filed: Jul. 12, 2017

(65) Prior Publication Data
US 2018/0014515 A1 Jan. 18, 2018

Related U.S. Application Data

(60) Provisional application No. 62/361,171, filed on Jul. 12, 2016.

(51) Int. Cl.
| A01K 87/00 | (2006.01) |
| A01K 77/00 | (2006.01) |
| A01K 97/00 | (2006.01) |
| A01K 97/10 | (2006.01) |

(52) U.S. Cl.
CPC ........... *A01K 87/007* (2013.01); *A01K 77/00* (2013.01); *A01K 97/10* (2013.01)

(58) Field of Classification Search
CPC ...... A01K 87/007; A01K 87/08; A01K 97/10; A01K 77/00
See application file for complete search history.

(56) References Cited

U.S. PATENT DOCUMENTS

| 396,909 | A | * | 1/1889 | Annin | A01K 87/00 43/25 |
|---|---|---|---|---|---|
| 952,552 | A | | 3/1910 | Weldon | |
| 1,920,790 | A | * | 8/1933 | Hendrie | F42B 30/14 43/5 |
| 2,129,469 | A | * | 9/1938 | Hedges | G01G 3/02 177/131 |
| 2,483,071 | A | * | 9/1949 | Stine | A01K 87/00 43/18.1 R |
| 2,750,184 | A | | 6/1956 | Warndahl | |
| 2,765,535 | A | * | 10/1956 | Weber | A01K 77/00 33/760 |
| 2,770,907 | A | | 11/1956 | Sharer | |
| 3,077,237 | A | * | 2/1963 | Nakayama | A01K 77/00 177/245 |
| 3,223,189 | A | * | 12/1965 | Robbins | A01K 77/00 177/149 |
| 3,276,527 | A | * | 10/1966 | Nelson | G01G 3/02 177/149 |

(Continued)

FOREIGN PATENT DOCUMENTS

DE  19519673 A1 * 11/1995 ........... A01K 87/007

*Primary Examiner* — Magdalena Topolski
*Assistant Examiner* — Morgan T Barlow
(74) *Attorney, Agent, or Firm* — Boudwin Intellectual Property; Daniel Boudwin

(57) ABSTRACT

The fishing tool includes an elongated member having a handle disposed at a first end thereof. The handle includes an open lower end. Indicia indicating various length measurements are disposed along the length of the elongated member. A scale is disposed within the elongated member, wherein the scale includes a hook operably affixed thereto, the hook extending through the open lower end. A mounting member is removably affixed to an exterior surface of the elongated member, wherein the mounting member can secure the elongated member to a mount.

12 Claims, 4 Drawing Sheets

(56) References Cited

U.S. PATENT DOCUMENTS

| | | | | |
|---|---|---|---|---|
| 3,344,551 A * | 10/1967 | Chestnut | A01K 97/10 43/55 |
| 3,523,666 A * | 8/1970 | Bloodsworth | A01K 97/10 248/514 |
| 4,036,368 A * | 7/1977 | Munsch | A01K 97/10 211/70.8 |
| 4,569,466 A * | 2/1986 | Webber | A01K 97/10 224/268 |
| 4,631,851 A * | 12/1986 | Whitehurst | A01K 77/00 43/7 |
| 4,765,420 A * | 8/1988 | Mengo | A01K 77/00 177/149 |
| 4,785,897 A * | 11/1988 | Keinert, Jr. | A01K 77/00 177/148 |
| 4,839,675 A * | 6/1989 | Owen | A01K 97/00 396/429 |
| 4,858,365 A * | 8/1989 | Struntz | A01K 87/08 43/23 |
| 4,995,188 A | 2/1991 | Ewing | |
| 5,016,384 A * | 5/1991 | Johnson | A01K 97/10 43/21.2 |
| 5,292,102 A * | 3/1994 | Hoover | A01K 97/10 248/231.41 |
| 5,637,838 A * | 6/1997 | Arey | G01B 3/08 177/148 |
| 5,664,712 A * | 9/1997 | Smrt | A45F 5/02 224/250 |
| 5,845,891 A * | 12/1998 | West | A01K 97/10 248/538 |
| 5,864,980 A * | 2/1999 | Lai | A01K 87/02 43/18.1 CT |
| 5,915,942 A * | 6/1999 | Ratliffe | A01K 97/10 224/251 |
| 5,934,004 A * | 8/1999 | Koe | A01K 97/10 43/21.2 |
| 6,094,996 A * | 8/2000 | Campbell | A01K 77/00 73/862.474 |
| 6,129,251 A * | 10/2000 | Lajoie | A01K 97/10 224/197 |
| 6,546,665 B1 * | 4/2003 | Eldredge | A01K 87/007 43/17.5 |
| 6,765,155 B1 * | 7/2004 | Gray | G01B 3/04 177/148 |
| 6,959,499 B2 * | 11/2005 | Bini | A01K 97/00 33/511 |
| 7,272,909 B2 * | 9/2007 | Weber | A01K 97/10 43/15 |
| 7,594,354 B1 * | 9/2009 | Chadwick | A01K 97/10 43/21.2 |
| 7,605,332 B2 * | 10/2009 | Winkler | A01K 97/08 177/25.13 |
| 8,146,261 B1 * | 4/2012 | Perry | G01B 3/1084 33/511 |
| 8,431,838 B2 * | 4/2013 | Bond | G01G 19/60 177/131 |
| 8,695,268 B2 * | 4/2014 | Gouthro | A01K 97/125 248/532 |
| 9,021,737 B1 * | 5/2015 | Bradstreet | A01K 87/00 43/17.5 |
| 9,080,848 B1 * | 7/2015 | Gold | G01B 5/02 |
| 9,504,240 B1 * | 11/2016 | Christensen | A01K 97/10 |
| 2002/0017048 A1 * | 2/2002 | Lam | A01K 97/00 43/4 |
| 2004/0124297 A1 * | 7/2004 | Steer | A01K 89/00 242/223 |
| 2005/0144829 A1 * | 7/2005 | Gonzalez | A01K 97/10 43/21.2 |
| 2007/0084104 A1 * | 4/2007 | Demetris | A01K 87/007 43/18.1 CT |
| 2007/0214706 A1 * | 9/2007 | Donato | A01K 91/08 43/21.2 |
| 2007/0273951 A1 * | 11/2007 | Ribi | G02F 1/0121 359/237 |
| 2008/0029313 A1 * | 2/2008 | Lentine | A01K 97/00 177/148 |
| 2008/0083152 A1 | 4/2008 | Wang | |
| 2009/0084020 A1 | 4/2009 | Sorey | |
| 2009/0229168 A1 * | 9/2009 | Winkler | A01K 97/00 43/55 |
| 2010/0064539 A1 * | 3/2010 | Jacobs | A01K 87/007 33/700 |
| 2010/0200308 A1 * | 8/2010 | Pigott | A01K 77/00 177/245 |
| 2011/0220426 A1 * | 9/2011 | Bond | A01K 77/00 177/245 |
| 2012/0036758 A1 * | 2/2012 | Steffens | A01K 77/00 43/12 |
| 2012/0204469 A1 * | 8/2012 | Kowalski | A01K 97/10 43/17.5 |
| 2013/0331146 A1 * | 12/2013 | Wills | H04M 1/0264 455/556.1 |
| 2014/0007443 A1 * | 1/2014 | Orman | G01B 3/1084 33/701 |
| 2015/0068102 A1 * | 3/2015 | Britz | A01K 97/00 43/25 |
| 2016/0007581 A1 * | 1/2016 | Davidson | A01K 85/02 43/17.1 |
| 2016/0081320 A1 * | 3/2016 | Olexson, Sr. | A01K 97/24 43/4.5 |
| 2016/0194145 A1 * | 7/2016 | Bloch | B25G 3/20 43/6 |
| 2016/0295846 A1 * | 10/2016 | Crummy | A01K 97/00 |
| 2016/0324133 A1 * | 11/2016 | Britz | A01K 87/08 |
| 2017/0202197 A1 * | 7/2017 | Wilson | A01K 97/10 |
| 2018/0356278 A1 * | 12/2018 | Lebedev | G01G 19/00 |
| 2018/0361598 A1 * | 12/2018 | Williams | B26B 11/00 |
| 2019/0387730 A1 * | 12/2019 | Sandland, Sr. | A01K 97/10 |

* cited by examiner

FISHING TOOL

CROSS REFERENCE TO RELATED APPLICATIONS

This application claims the benefit of U.S. Provisional Application No. 62/361,171 filed on Jul. 12, 2016. The above identified patent application is herein incorporated by reference in its entirety to provide continuity of disclosure.

BACKGROUND OF THE INVENTION

The present invention relates to fishing tools. Specifically, it relates to fishing tools featuring indicia to measure the length of a fish and an internal scale to weigh the fish.

Many people enjoy fishing; however, it can be difficult to abide by the rules requiring certain sizes and weights of fish to be thrown back to prevent overfishing and destroying a population of fish. Generally, fishermen make an approximation based on experience and appearance to determine whether to throw a fish back. As a result, fishermen may be catching and keeping fish that must be thrown back, risking overfishing and possible fines. Additionally, fishermen may be throwing fish back that are in fact large enough to keep, leading to wasted catches. Therefore, a device that can assist fishermen in more accurately determining the size and weight of fish as they are caught is needed.

In light of the devices disclosed in the known art, it is submitted that the present invention substantially diverges in design elements from the known art and consequently it is clear that there is a need in the art for an improvement to existing fishing tools. In this regard, the instant invention substantially fulfills these needs.

SUMMARY OF THE INVENTION

In view of the foregoing disadvantages inherent in the known types of fishing tools now present in the prior art, the present invention provides a fishing tool wherein the same can be utilized for providing convenience for the user when measuring and weighing fish at the time of catching.

The present system comprises an elongated member having a handle disposed at a first end thereof. The handle includes an open lower end. Indicia indicating length measurements are disposed along the length of the elongated member. A scale is disposed within the elongated member, wherein the scale further comprises a hook operably affixed thereto. The hook is configured to extend through the open lower end. A mounting member is removably affixed to an exterior surface of the elongated member and is configured to removably secure the elongated member to a mount. In some embodiments, a cap is hingedly affixed to the open lower end and is configured to removably secure to the open lower end, such that the hook is covered. In another embodiment, a display is operably connected to the scale, wherein the display is configured to indicate the weight measured by the scale. In other embodiments, a cover is hingedly affixed to the elongated member and is configured to cover the display. In yet another embodiment, a reel is disposed on the elongated member and is configured to feed a line. In some embodiments, a plurality of rings are disposed along the length of the elongated member, wherein the plurality of rings are configured to receive the line therethrough. In another embodiment, a circular member is affixed to a second end of the elongated member, wherein a net extends from the circular member. In other embodiments, the indicia are configured to glow in low-light conditions. In yet another embodiment, the display is configured to glow in low-light conditions. In some embodiments, the display is digital.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
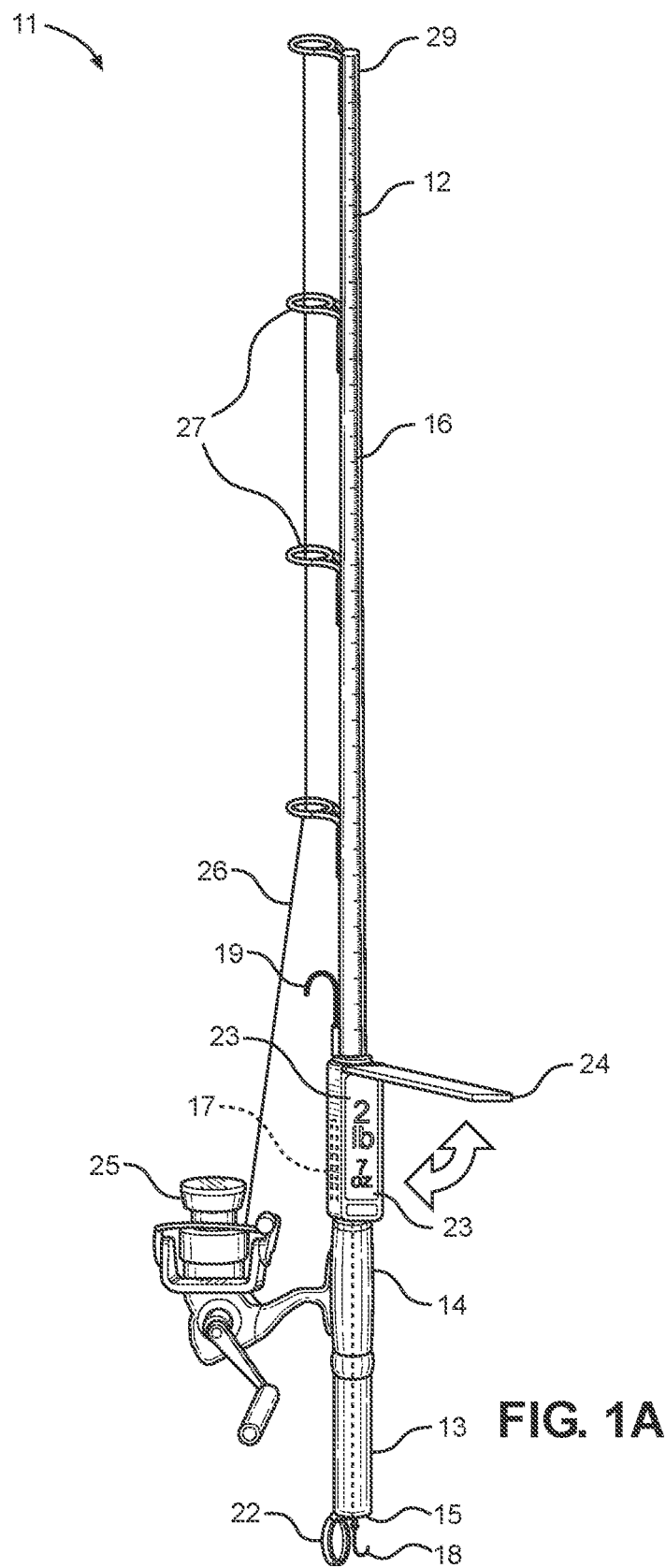
FIG. 1A shows a perspective view of an embodiment of the fishing tool.

Reference is made herein to the attached drawings. Like reference numerals are used throughout the drawings to depict like or similar elements of the fishing tool. The figures are intended for representative purposes only and should not be considered to be limiting in any respect.

Figure 1B:
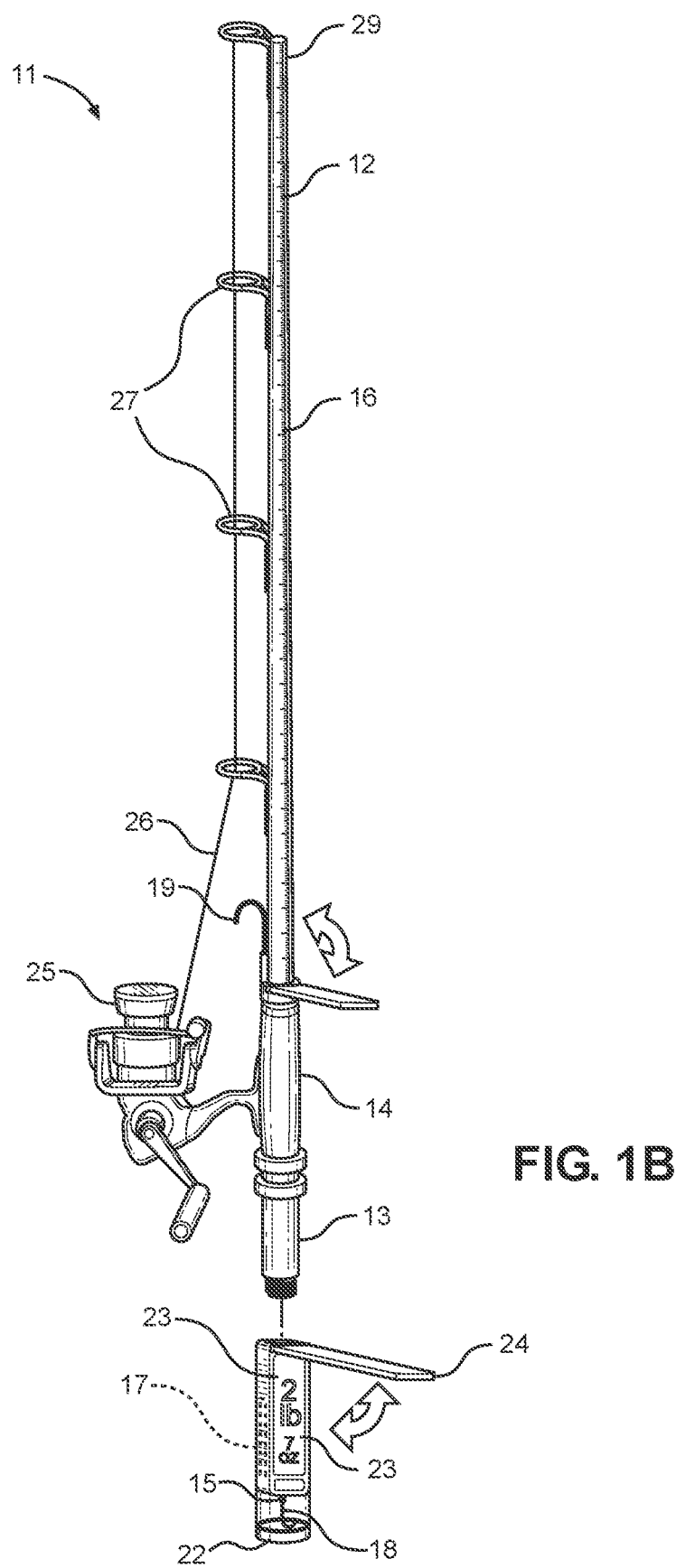
FIG. 1B shows an exploded view of an embodiment of the fishing tool.

Referring now to FIGS. 1A and 1B, there is shown a perspective view of an embodiment of the fishing tool and an exploded view of an embodiment of the fishing tool, respectively. The fishing tool 11 comprises an elongated member 12 having a handle 13 at a first end 14 of the elongated member. In some embodiments, the elongated member 12 is configured to be adjustable in length, such as through telescopic extension. The fishing tool 11 further comprises indicia 16 disposed along the length of the elongated member 12. The indicia 16 are configured to indicate length measurements. In some embodiments, the indicia 16 are configured to glow in low-light conditions, such that a user can read the indicia 16. The handle 13 has an open lower end 15 such that the interior of the handle 13 can be accessed therethrough. In the illustrated embodiment, the handle 13 further comprises a cap 22 hingedly affixed to the open lower end 15. The cap 22 is configured to removably secure to the open lower end 15, such that the interior of the handle 13 is not accessible when the cap 22 is secured to the open lower end 15.

In the illustrated embodiment of FIG. 1A, the fishing tool 11 further comprises a scale 17 disposed within the interior of the elongated member 12. The scale 17 is configured to measure the weight of an object, such as a fish, affixed thereto. A hook 18 is operably connected to the scale 17, such that the weight of an object affixed to the hook 18 is measured by the scale 17. The hook 18 extends through the interior of the handle 13. In this way, the hook 18 protrudes through the open lower end 15, such that the user can attach an object thereto. In the illustrated embodiment, the cap 22 is further configured to enclose the hook 18 within the interior volume of the handle 13 when removably secured to the open lower end 15. In the illustrated embodiment of FIG. 1B, the scale 17, hook 18, and cap 22 comprise a separate assembly configured to removably secure to the handle 13, such as, but not limited to, via a threaded connection. In this way, the user can use the fishing tool 11 unencumbered by the any additional weight the scale 17 may provide.

In the illustrated embodiments, the fishing tool 11 further comprises a display 23 operably connected to the scale 17 such that it is configured to indicate the weight measured by the scale 17. In some embodiments, the display 23 comprises a digital readout. In another embodiment, the display 23 is configured to glow in low-light conditions. This can be achieved through various photosensitive materials that exude light in low-light conditions. In other embodiments, the display 23 further comprises a light source configured to illuminate the display 23 so that a user can read it in low-light conditions. In the illustrated embodiment, the fishing tool 11 further comprises a cover 24 hingedly affixed to the elongated member 12 at the display 23, wherein the cover 24 is configured to pivot about a hinge to occupy a first position and a second position. In the first position, the cover 24 overlaps the display 23 such that it protects the display 23 from damage. In the second position, the cover 24 reveals the display 23 to be read by a user. In some embodiments, the cover 24 is perpendicular to the elongated member 12 when in the second position. In this way, the cover 24 can be used as a starting point for making length measurements along the indicia 16.

In the illustrated embodiment, the fishing tool 11 further comprises a reel 25 disposed on the elongated member 12. The reel 25 is configured to rotate about an axis perpendicular to the elongated member 12 thereby feeding a line 26 disposed about the reel 25. In the illustrated embodiment, a plurality of rings 27 are disposed along the length of the elongated member 12 and are configured to receive the line 26 therethrough. In this way, the line is guided to a second end 29 of the elongated member. A user can then attach a fishing hook to the line 26 and cast the line 26 from the second end 29.

The fishing tool 11 further comprises a mounting member 19 removably affixed to the elongated rod 12, wherein the mounting member 19 is configured to removably secure the fishing tool 11 to a mount, such as a tree. In the illustrated embodiment, the mounting member 19 comprises a hooked blade configured to pierce into a mount, such as a tree. This allows the user to secure the fishing tool 11 to a mount, such that the user can weigh and measure an object using the indicia 16 and the scale 17 without the need to hold the fishing tool 11. In other embodiments, the mounting member 19 comprises a variety of other securing means, including but not limited to a mounting bracket to be secured via fasteners, a strap to tie around a mount, or a hook allowing a user to hang the fishing tool 11 from a mount.

Figure 2:
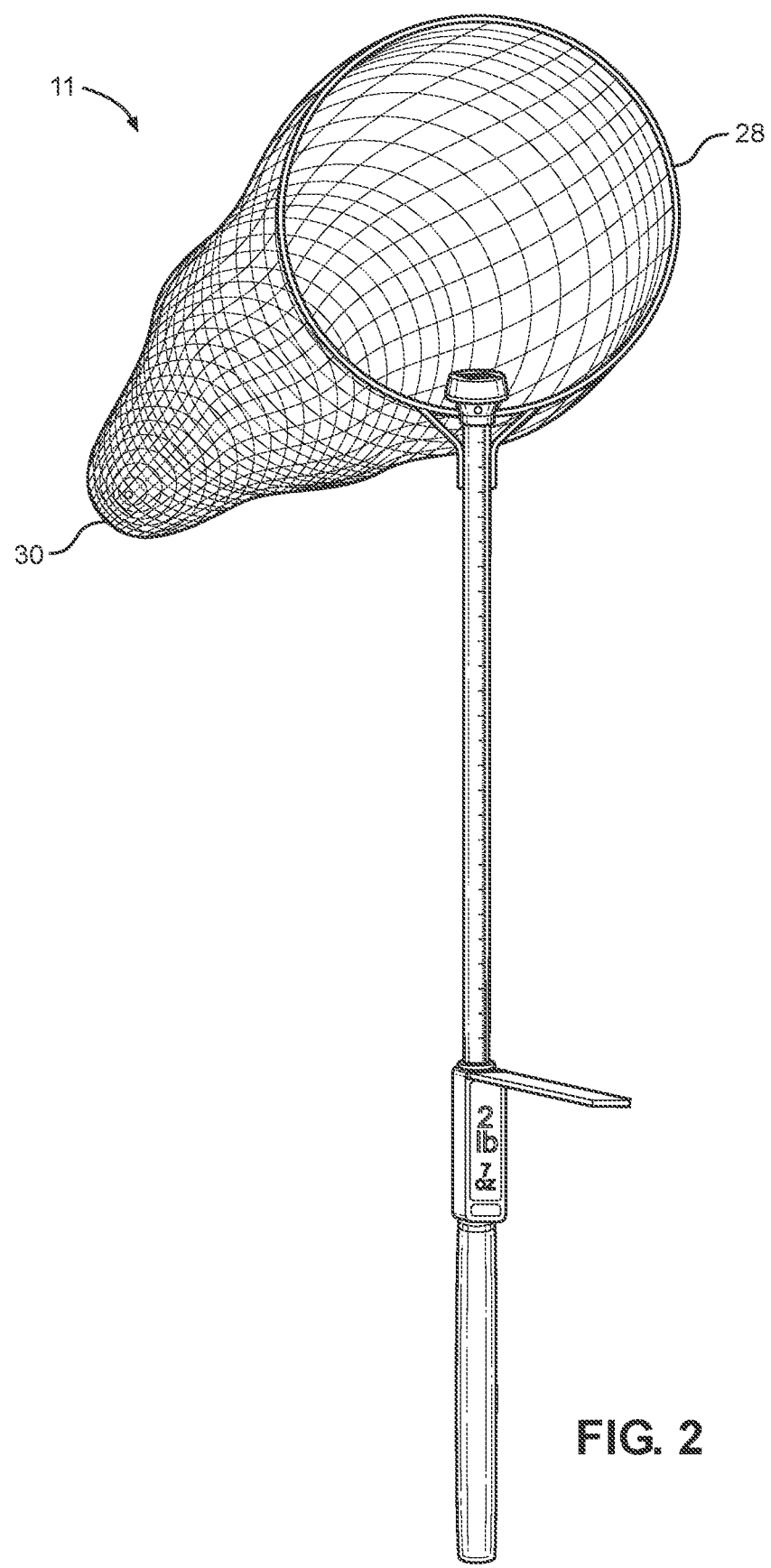
FIG. 2 shows a perspective view of an alternate embodiment of the fishing tool.

Referring now to FIG. 2, there is shown a perspective view of an alternate embodiment of the fishing tool. In the illustrated embodiment, the fishing tool 11 comprises the same features as illustrated in FIG. 1, however the reel 25, line 26, and plurality of rings 27 of FIG. 1 have been removed. Instead, a circular member is disposed at the second end 29. Extending from the circular member 28 is a net 30 having an open end at the circular member 28. In this way, an interior volume of the net 30 is configured to receive solid objects therein, while allowing liquid to pass through.

Figure 3:
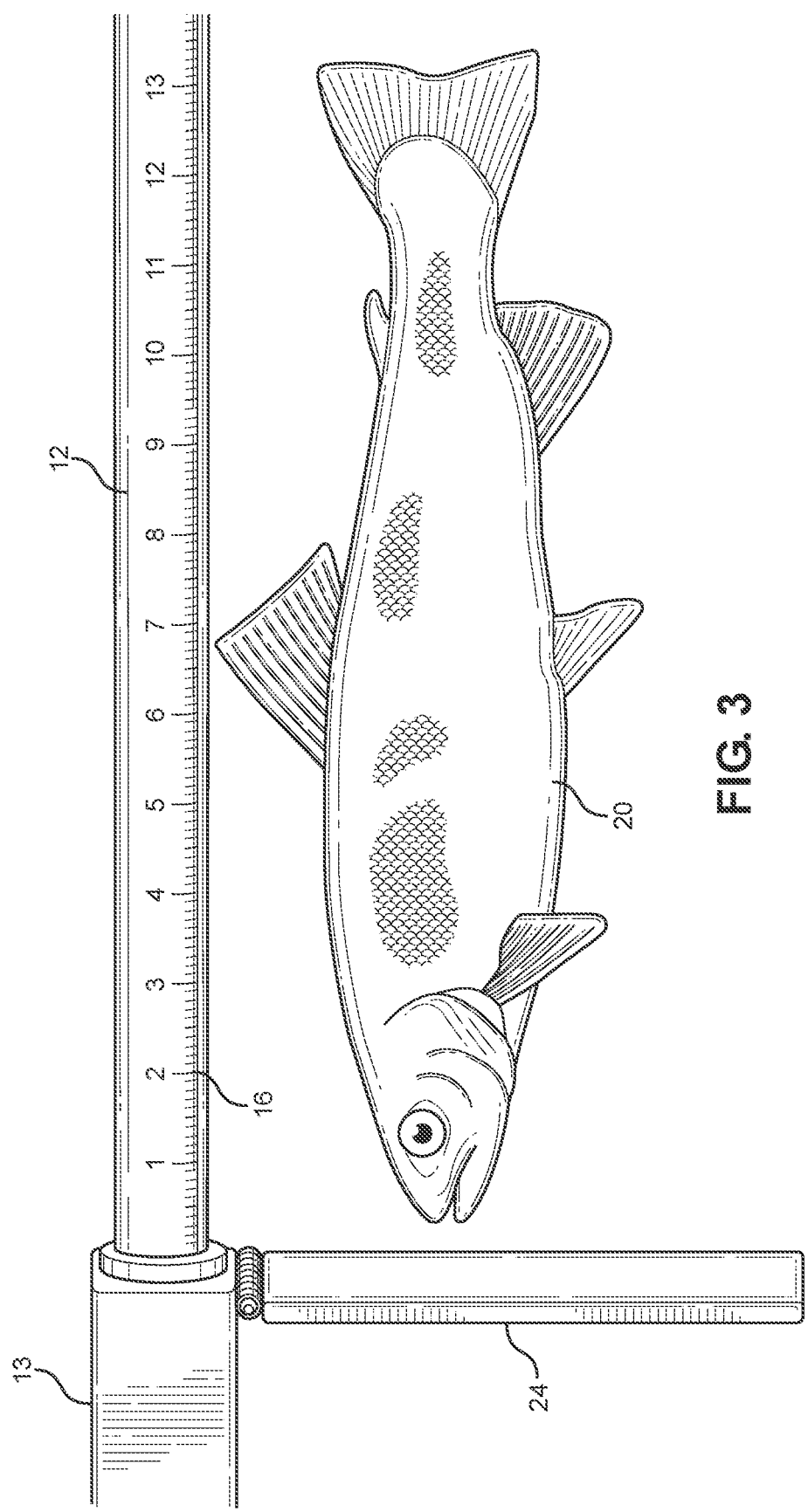
FIG. 3 shows a close-up view of an embodiment of the fishing tool in use.

Referring now to FIG. 3, there is shown a close-up view of an embodiment of the fishing tool in use. In the illustrated embodiment, the indicia 16 along the elongated member 12 are used to measure the length of a fish 20. The cover 24 is moved to the second position, where the cover 24 is used as a starting point to begin measuring the fish 20. The measurement can be done at the time the fish 20 is caught by lining one end of the fish 20 with the cover 24 in the second position and reading the indicia 16 at an opposite end of the fish 20. The elongated member 12 can also be secured to a mount by the mounting member so that the user can measure the length of the fish 20 without needing to hold the elongated member 12.

Referring now to FIGS. 1-5, in one use, a user secures a fishing hook to the line 26 and casts the line 26 from the second end 29 into a body of water. When a fish 20 is caught on the line 26, the user rotates the reel 25 to pull the fish 20 towards the user. In an alternate embodiment, the user instead places the net 30 attached to the circular member 28 into the body of water and maneuvers the net 30 around such that a fish 20 is caught within the net 30. As the fish 20 is pulled from the body of water, the user measures the length of the fish 20 by placing one end at the cover 24 after the cover 24 is pivoted to the second position. The user then reads the indicia 16 at the opposing end of the fish 20. Once the length has been determined, the user can measure the weight of the fish 20. The cap 22 is opened revealing the hook 18 extending through the open lower end 15 of the handle 13. The user then attaches the fish 20 to the hook 18 and reads the weight indicated on the display 23. Should the user require the use of both hands for each of these measurements, the user can removably secure the fishing tool 11 to a mount, such as a tree by removably securing the mounting member 19 disposed on the elongated member 12 to the mount. In the illustrated embodiment of FIG. 1, the mounting member 19 comprises a blade configured to pierce into a mount, such as a tree.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing tool, comprising:
    an elongated member;
    a handle disposed at a first end of the elongated member, wherein the handle has an open lower end and an upper end affixed to the elongated member;
    indicia disposed along the entire length of the elongated member, wherein the indicia are configured to indicate length measurements;
    a scale disposed within the handle;
    a hook operably affixed to the scale configured to extend through the open lower end;
    a display disposed on an upper end of the handle, wherein the display is operably connected to the scale;
    wherein the display is configured to indicate the weight measured by the scale;
    a cover directly and hingedly affixed to the display along an upper edge thereof;
    wherein the cover is selectively movable between a first position and a second position;

wherein in the first position, the cover overlaps the display, and wherein in the second position, the cover is disposed perpendicular to the elongated member at the base such that an exterior surface of the cover is adjacent to the indicia, and, in the second position, the cover is further configured to assist as a starting point for the length measurements;

a mounting member is removably affixed to the elongated member;

wherein the mounting member comprises a hooked blade configured to pierce into a mounting surface such that the elongated member is removably secured thereto.

2. The fishing tool of claim 1, further comprising a cap hingedly affixed to the open lower end configured to removably secure to the open lower end such that the hook is covered.

3. The fishing tool of claim 1, further comprising a reel disposed on the elongated member, wherein the reel is configured to feed a line.

4. The fishing tool of claim 3, further comprising a plurality of rings disposed along the length of the elongated member, configured to receive the line therethrough.

5. The fishing tool of claim 1, further comprising a circular member affixed to a second end of the elongated member, wherein a net extends from the circular member.

6. The fishing tool of claim 1, wherein the indicia are configured to glow in low-light conditions.

7. The fishing tool of claim 6, wherein the indicia comprise a photosensitive material configured to exude light in low-light conditions.

8. The fishing tool of claim 3, wherein the display is configured to glow in low-light conditions.

9. The fishing tool of claim 3, wherein the display is digital.

10. The fishing tool of claim 1, wherein the elongated member is telescopic such that it can adjust in length.

11. The fishing tool of claim 1, further comprising a cap hingedly affixed to the scale configured to removably secure to the scale such that the hook is covered.

12. A fishing tool, consisting of:

an elongated member;

a handle disposed at a first end of the elongated member, wherein the handle has an open lower end and an upper end affixed to the elongated member;

indicia disposed along the entire length of the elongated member, wherein the indicia are configured to indicate length measurements;

a scale disposed within the handle;

a hook operably affixed to the scale configured to extend through the open lower end;

a display disposed on an upper end of the handle, wherein the display is operably connected to the scale;

wherein the display is configured to indicate the weight measured by the scale;

a cover directly and hingedly affixed to the display along an upper edge thereof;

wherein the cover is selectively movable between a first position and a second position;

wherein in the first position, the cover overlaps the display, and wherein in the second position, the cover is disposed perpendicular to the elongated member at the base such that an exterior surface of the cover is adjacent to the indicia, and, in the second position, the cover is further configured to assist as a starting point for the length measurements;

a mounting member is removably affixed to the elongated member;

wherein the mounting member comprises a hooked blade configured to pierce into a mounting surface such that the elongated member is removably secured thereto.

\* \* \* \* \*